Sept. 14, 1965 M. J. WRIGHT 3,206,614
PULSE LENGTHENING CIRCUIT EMPLOYING A SEMI-CONDUCTOR CONTROLLED RECTIFIER
Filed Sept. 10, 1962
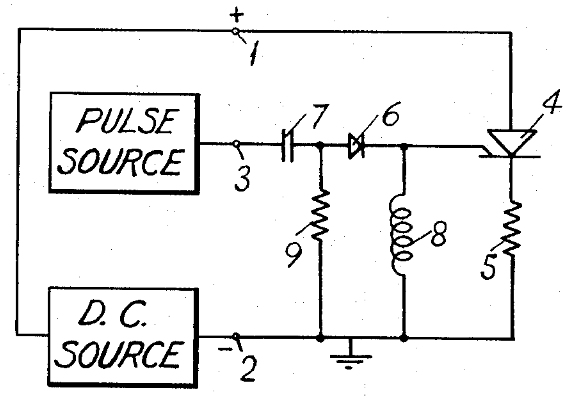

1

3,206,614

PULSE LENGTHENING CIRCUIT EMPLOYING A SEMI-CONDUCTOR CONTROLLED RECTIFIER

Maurice James Wright, Harborne, Birmingham, England, assignor to Joseph Lucas (Industries) Limited, Birmingham, England Filed Sept. 10, 1962, Ser. No. 222,380
Claims priority, application Great Britain, Sept. 18, 1961, 33,323
2 Claims. (Cl. 307—88.5)

The object of this invention is to provide a pulse lengthening circuit employing a semi-conductor controlled rectifier in a convenient form.

The present invention makes use of a device known as a controlled rectifier, the characteristic of which is that if a triggering pulse is applied between its gate and cathode terminals the rectifier becomes conductive, and thereafter continues to conduct, even when the triggering pulse is removed, until the anode-cathode current falls practically to zero. Furthermore, it has recently been discovered that controlled rectifiers manufactured in a certain manner have the additional property that they can be switched off by a pulse of opposite polarity (but not necessarily of equal magnitude) applied between the gate and cathode. Throughout this specification the term "switchable rectifier" is used to mean a controlled rectifier having this additional property, a convenient method of manufacturing a switchable rectifier being described in pending application No. 211,674, filed July 23, 1962.

A monostable circuit in accordance with the invention comprises in combination first and second terminals adapted for connection to a source of voltage so as to be of relatively positive and negative polarity respectively, a third terminal adapted for connection to a source of triggering pulses, a switchable rectifier having its anode, cathode and gate connected respectively to the first, second and third terminals, a load in the anode-cathode circuit, and an inductor interconnecting the gate and second terminal, the arrangement being such that when a triggering pulse is received the switchable rectifier is switched on, whereafter current flowing in the inductor serves after a predetermined delay to switch the switchable rectifier off.

The accompanying drawing is a circuit diagram illustrating one example of the invention.

Referring to the drawing, there is provided a first terminal 1 adapted for connection to a voltage source so as to be of positive polarity, a second earthed terminal 2, and a third terminal 3 adapted for connection to a source of triggering pulses. The terminal 1 is connected to the anode of a switchable rectifier 4 having its cathode connected through a load 5 to the second terminal and its gate connected through a diode 6 and capacitor 7 in series to a third terminal. Furthermore, the gate is connected to the terminal 2 through an inductor 8, whilst a point intermediate the diode 6 and capacitor 7 is connected through a resistor 9 to the terminal 2.

In operation, the switchable rectifier 4 is normally nonconductive. When a positive triggering pulse is received, it is coupled to the gate of switchable rectifier 4 by means of capacitor 7 and diode 6 turning it on. It will be realized that this pulse need only be a short pulse; however, if a relatively long pulse is utilized, it is differentiated by the capacitor 7 and resistor 9 to provide a short pulse

2 of proper polarity to the switchable rectifier 4. The diode 6 will also block any pulses of opposite polarity which would turn switchable rectifier off. Current now builds up in the inductor 8 until a predetermined current is flowing, at which point the switchable rectifier is switched off. Meanwhile, capacitor 7 discharges through the resistor 9. The cycle is repeated each time a triggering pulse is received.

Having thus described my invention what I claim as new and desire to secure by Letters Patent is:

1. A pulse lengthening circuit comprising in combination a direct current source, positive and negative terminals connected to said direct current source, a source of positive pulses, a switchable rectifier having an anode, a cathode and a gate, said switchable rectifier being switched on by a positive pulse between its gate and cathode, and being switched off by a negative pulse between its gate and cathode, means connecting the anode of said switchable rectifier to said positive terminal, a diode having its cathode connected to the gate of said switchable rectifier and its anode connected to said pulse source, a load connected between the cathode of said switchable rectifier and said negative terminal, and an inductor through which the gate of said switchable rectifier is connected to said negative terminal, said switchable rectifier being switched on by current flow between its gate and cathode when a positive pulse is received from said pulse source, said diode isolating said gate from said pulse source when said switchable rectifier conducts, and said switchable rectifier being switched off by current flow between its gate and cathode from the inductor after the switchable rectifier has been conducting for a predetermined length of time, a capacitor through which the anode of said diode is connected to said pulse source, and a resistor through which the anode of said diode is connected to said negative terminal, said capacitor and resistor cooperating to differentiate a pulse from said source of positive pulses.

2. A pulse lengthening circuit as claimed in claim 1 wherein said load connected between the cathode of said switchable rectifier and said negative terminal comprises a resistive load.

References Cited by the Examiner

UNITED STATES PATENTS

| | | | |
|---|---|---|---|
| 2,906,825 | 9/59 | Thorsen | 307—88.5 |
| 2,939,064 | 5/60 | Momberg et al. | 307—88.5 |
| 2,963,592 | 12/60 | Degraaf | 307—88.5 |
| 3,058,011 | 10/62 | Dutton | 307—88.5 |
| 3,070,739 | 12/62 | Hansen et al. | 307—88.5 |
| 3,099,754 | 7/63 | Jones et al. | 307—88.5 |

OTHER REFERENCES

Electronics article "Using Inductive Control in Computer Circuits" by William Carey, Sept. 18, 1959, pp. 31–33.

Solid State Products, Inc., Bulletin D410–02–3–60, March 1960 (pages 3–5 relied on).

Solid State Products, Inc., "Controlling Relays With Microsecond Pulses," July 1961 (entire publication relied on).

ARTHUR GAUSS, *Primary Examiner.*

JOHN W. HUCKERT, *Examiner.*